United States Patent
Ohno (10) Patent No.: US 6,778,816 B1
(45) Date of Patent: Aug. 17, 2004

(54) COMMUNICATION TERMINAL DEVICE (75) Inventor: Hiroyuki Ohno, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/577,495

(22) Filed: May 25, 2000

(30) Foreign Application Priority Data

Nov. 29, 1999 (JP) ............................................ 11-337936

(51) Int. Cl.⁷ .............................................. H04B 1/16
(52) U.S. Cl. .................... 455/343.1; 455/574
(58) Field of Search ................................. 455/343, 574, 455/102, 132, 134, 343.1, 343.5, 115.3, 42, 343.2

(56) References Cited

U.S. PATENT DOCUMENTS

| | | | |
|---|---|---|---|
| 5,600,673 A | | 2/1997 | Kimura et al. |
| 6,246,867 B1 | * | 6/2001 | Jakobsson .................. 340/7.32 |
| 6,272,116 B1 | * | 8/2001 | Kurihara ..................... 370/311 |

FOREIGN PATENT DOCUMENTS

| JP | 60-154756 | 8/1985 |
|---|---|---|
| JP | 8-163187 | 6/1996 |

* cited by examiner

Primary Examiner—Nay Maung
Assistant Examiner—Tu Nguyen
(74) Attorney, Agent, or Firm—Oblon, Spivak, McClelland, Maier & Neustadt, P.C.

(57) ABSTRACT

A communication terminal device comprising: a plurality of demodulation circuits that correspond to the received signals of the same frequency band, said signals being modulated in the respectively different modulation modes, a decision circuit for determining the modulation mode of each of the received signals whose reception level is greater than a predetermined level, on the basis of the frequency component of the received signal, and a control circuit, which puts one of the demodulation circuits that corresponds to the modulation mode of said received signal to an active state on the basis of the decision made by said decision circuit, and simultaneously puts said decision circuit to an inactive state. Due to this construction, by use of this communication terminal device capable of communicating, in various communication modes corresponding to a plurality of communication system, the total power consumption can be greatly reduced.

13 Claims, 5 Drawing Sheets

COMMUNICATION TERMINAL DEVICE

BACKGROUND OF THE INVENTION

1. Field of the Invention

The present invention relates to a multi-mode communication terminal device capable of communicating in various communication modes corresponding to a plurality of communication systems.

2. Description of the Related Art

Figure 5:
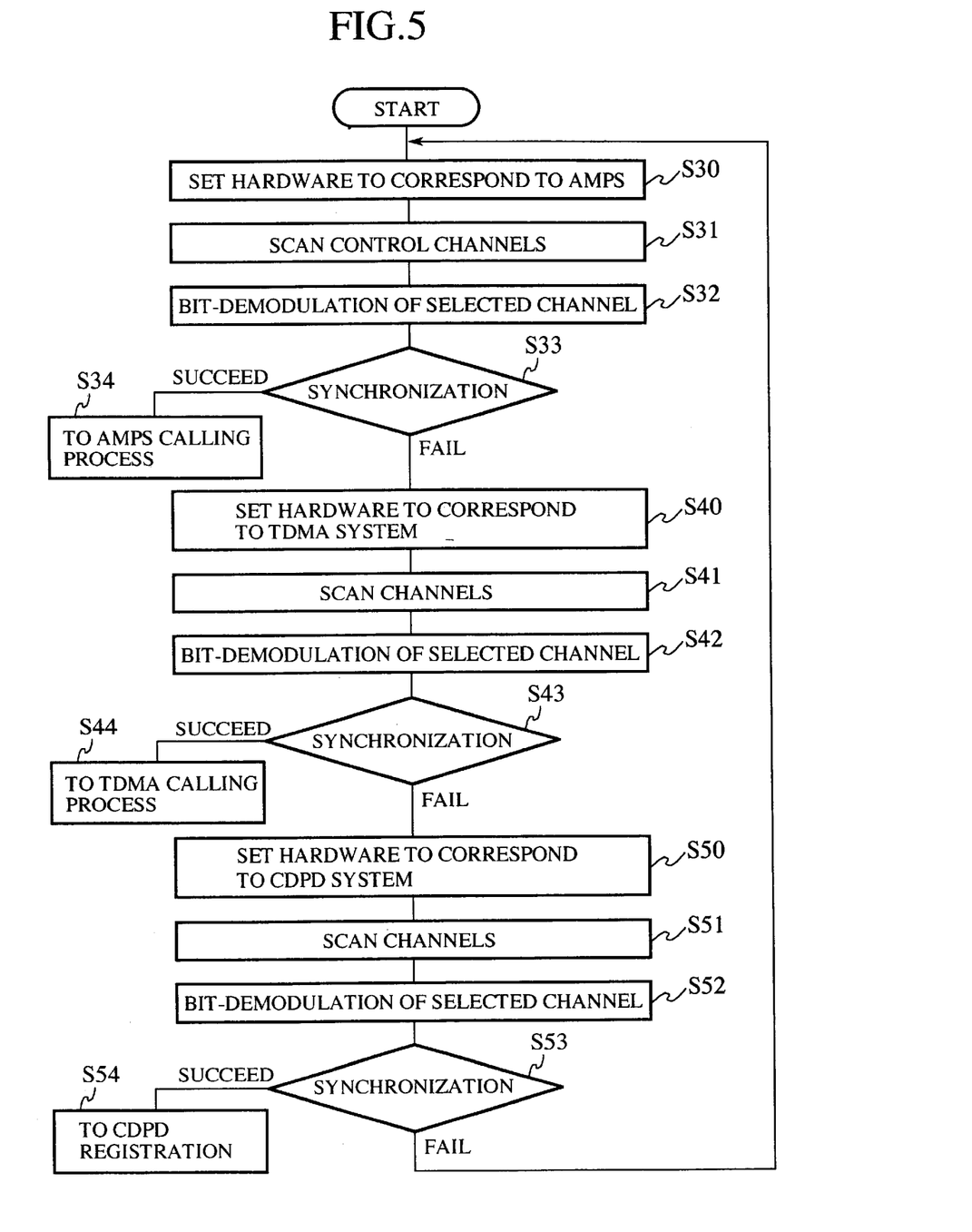
FIG. 5 is a flowchart showing the procedure for signal reception carried out by a conventional communication terminal device.

FIG. 5 is a flowchart showing the conventional signal receiving process performed in the automotive-use telephone systems currently adopted in the North American countries, and more particularly showing the signal receiving process conducted in a communication terminal device supporting three different modulation modes within the same frequency band, namely the FM modulation mode, the π/4 DQPSK mode and the GMSK mode, which are adopted in the communication systems such as the AMPS (Advanced Mobile Phone System), the North-American TDMA (Time Division Multiple Access) system, and the CDPD (Cellular Digital Packet Data) system, respectively. The signal receiving process here includes the process for identifying the modulation mode of these communication systems and controlling the calling process thereof.

Next, the procedure for carrying out this signal receiving process is now explained.

First of all, in step S30, hardware of the communication terminal device is set to comply with the AMPS system, namely the FM modulation mode, and thereafter the scanning operation with respect to the control channels is performed by the RSSI (Receive Signal Strength Indicator) in step S31.

Then, in step S32, the control channels whose RSSI value is detected to be greater than the predetermined value are captured and the bit demodulation of the thus captured channels is carried out in step S32, which is followed by the synchronizing process thereof in step S33 in accordance with the procedure for receiving FM-modulated signals. At this stage, if the synchronization in step S33 is completed successfully, the procedure then advances to step S34 in which the calling process of the AMPS system is carried out. On the other hand, if the synchronization is unsuccessful, the procedure advances to step S40, in which hardware of the communication terminal device is set to comply with the North-American TDMA System, namely the π/4 DQPSK mode, and thereafter the RSSI scanning operation with respect to the concerned channels is performed in step S41.

After these operations, in step S42, the channels whose RSSI value is detected to be greater than the predetermined value are captured and the bit demodulation of the thus captured channels is carried out in step S42, which is followed by the synchronizing operation thereof in step S43 in accordance with the procedure for receiving the π/4 DQPSK-modulated signals. At this stage, if the synchronization in step S43 is completed successfully, the procedure then advances to step S44 in which the calling process of the North American TDMA system is carried out. On the other hand, if the synchronization is unsuccessful, the procedure advance to step S50, in which hardware of the communication terminal device is set to comply with the CPDP system, namely the GMSK mode, and thereafter the RSSI scanning operation with respect to the concerned channels is again carried out in step S51.

After these operations, in step S52, the channels whose RSSI value is detected to be greater than the predetermined value are captured and the bit demodulation of the thus captured channels are carried out in step S52, which is followed by the synchronizing operation thereof in step S53 in accordance with the procedure for receiving the GMSK-modulated signals. At this stage, if the synchronization in step S53 is completed successfully, the procedure then advances to step S54 in which the calling process of the CDPD system (or registration in this case) is carried out.

On the other hand, if the synchronization is unsuccessful, the procedure goes back to step S30, in which hardware of the communication terminal device is set to comply with the AMPS system, and the same procedures starting therefrom are repeated again.

In the aforementioned procedures, however, the RSSI scanning operation is carried out with respect to only some or all of the predetermined channels in the communication mode of each communication system. In other words, since the signal receiving procedure is conducted in such a manner that the RSSI scanning operation is carried out with respect to a large number of channels and thereafter those channels whose RSSI value is detected to be greater than the predetermined level are captured, this procedure may require a substantial time in some cases.

Further, in accordance with the aforementioned procedures, since the scanning operation for signals of even unused communication systems is carried out in the regions where only one system is employed, it may produce a waste of time, and the total power consumption may thereby be increased.

Still further, since even the channels captured in accordance with the result of the RSSI scanning operation whose RSSI level is greater than the predetermined RSSI level may not be able to receive the same signal in other different communication systems, the user of the communication terminal device will lose the best timing for receiving the signal.

Since the conventional terminal device is configured as mentioned above, there has been such a problem that in a case in which the terminal device corresponds to many communication systems, the time required for identifying the signal modulation mode of each communication system and carrying out the signal receiving process will be greatly increased, and thus the total power consumption may also be increased.

SUMMARY OF THE INVENTION

The present invention has been proposed to solve the problems aforementioned, and it is a first object of the present invention to provide a communication terminal device which is capable of identifying the received signal in a signal modulation mode decision circuit (hereinafter may be referred to just as a "decision circuit"), reducing the time required for deciding the signal modulation mode, and also capable of reducing the total power consumption.

The second object of the present invention is to provide a communication terminal device which is capable of identifying the received signal in a signal modulation mode decision circuit, reducing the time required for deciding the modulation mode, and also capable of reducing the total power consumption, as well as minimizing the overall size of the decision circuit.

The third object of the present invention is to provide a communication terminal device which is capable of reducing the time required for deciding the signal modulation mode and the total power consumption, and also capable of selecting a desired communication system out of a plurality of different communication systems, when many receivable signals of different communication systems are received.

In order to achieve the above objects, the communication terminal device according to the first aspect of the present invention is configured in such a manner that it comprises: a plurality of demodulation circuits that correspond to the received signals of the same frequency band, which signals being modulated in the respectively different modulation modes, a decision circuit for determining the modulation mode of each of the received signals whose reception level is greater than a predetermined level, on the basis of the frequency component of the received signal, and a control circuit, which puts one of the demodulation circuits that corresponds to the modulation mode of the received signal to an active state on the basis of the decision made by the decision circuit, and simultaneously puts the decision circuit to an inactive state.

In this construction, the control circuit puts all other demodulation circuits than the activated demodulation circuit to an inactive state, as well as the decision circuit.

The communication terminal device according to another aspect of the present invention is configured in such a manner that a first demodulation circuit among the plurality of demodulation circuits is an FM demodulation circuit, which first demodulation circuit being composed of a front-stage section and a rear-stage section, and the decision circuit inputs the frequency component of the received signal from the front-stage section that comprises therein a signal strength indicator and a discriminator, wherein a second demodulation circuit in the plurality of demodulation circuits is a GMSK demodulation circuit, which GMSK circuit sharing the front-stage section of the first demodulation circuit.

The communication terminal device according to further aspect of the present invention is configured in such a manner that the decision circuit further comprises: a first band-pass filter that allows only a first frequency component fed from the signal strength indicator, a second band-pass filter that allows only a second frequency component fed from the discriminator; a first integrator that integrates the first frequency component fed from the first band-pass filter and identifies its signal modulation mode; a second integrator that integrates the second frequency component fed from the second band-pass filter and identifies its signal modulation mode; and a signal modulation mode judging section that receives the outputs from the first and second integrators, and discriminates at least three signal modulation modes of the received signals.

In this construction, if there are a plurality of signal modulation modes determined at the decision circuit, the control circuit applies a predetermined priority order to the plurality of modulation modes.

DETAILED DESCRIPTION OF THE PREFERRED EMBODIMENTS

One embodiment of the present invention is now explained below.

Figure 1:
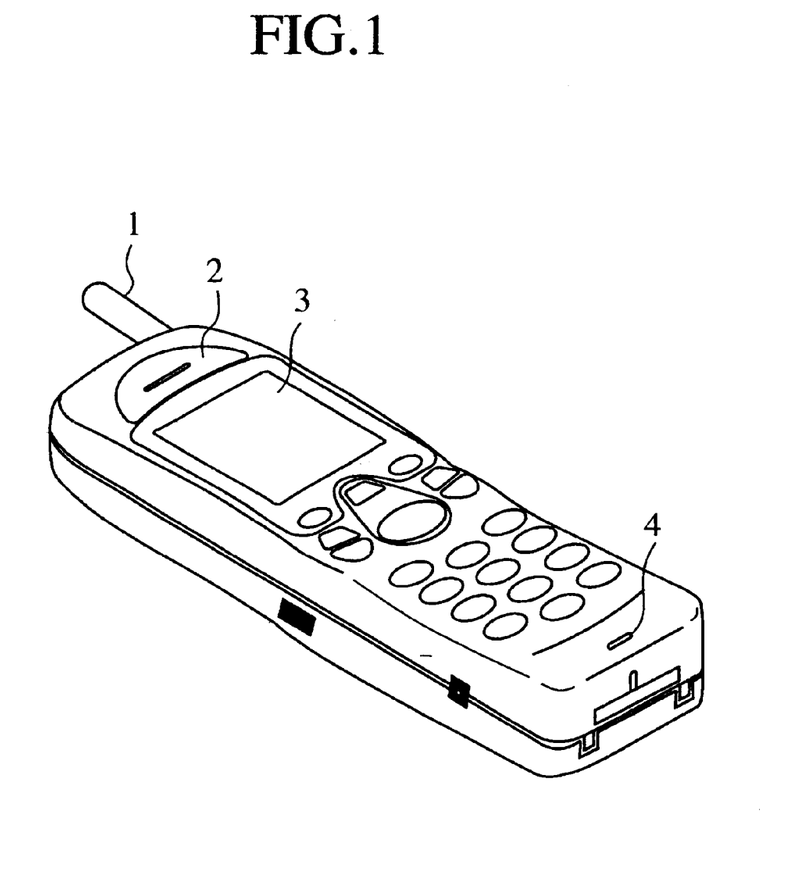
FIG. 1 is a perspective view of the communication terminal device according to one embodiment of the present.

FIG. 1 is a perspective view of the communication terminal device according to one embodiment of the present invention, wherein the communication terminal device shown in the figure is a so-called PDA (Personal Digital Assistant) having a built-in wireless communication section therein. In the figure, reference numeral 1 denotes an antenna, numeral 2 denotes a speaker, 3 denotes an LCD, and 4 denotes a microphone.

The PDA can transmit or receive the packet data to or from the upper-grade station by way of a radio wave transmitted or received through the antenna 1, and is equipped with applications such as a mailer for sending or receiving E-mails, a web browser and so on, which are indicated on the LCD display 2. In addition, the user of the PDA can perform a usual audio communication by use of the built-in speaker 2 and the microphone 4.

Figure 2:
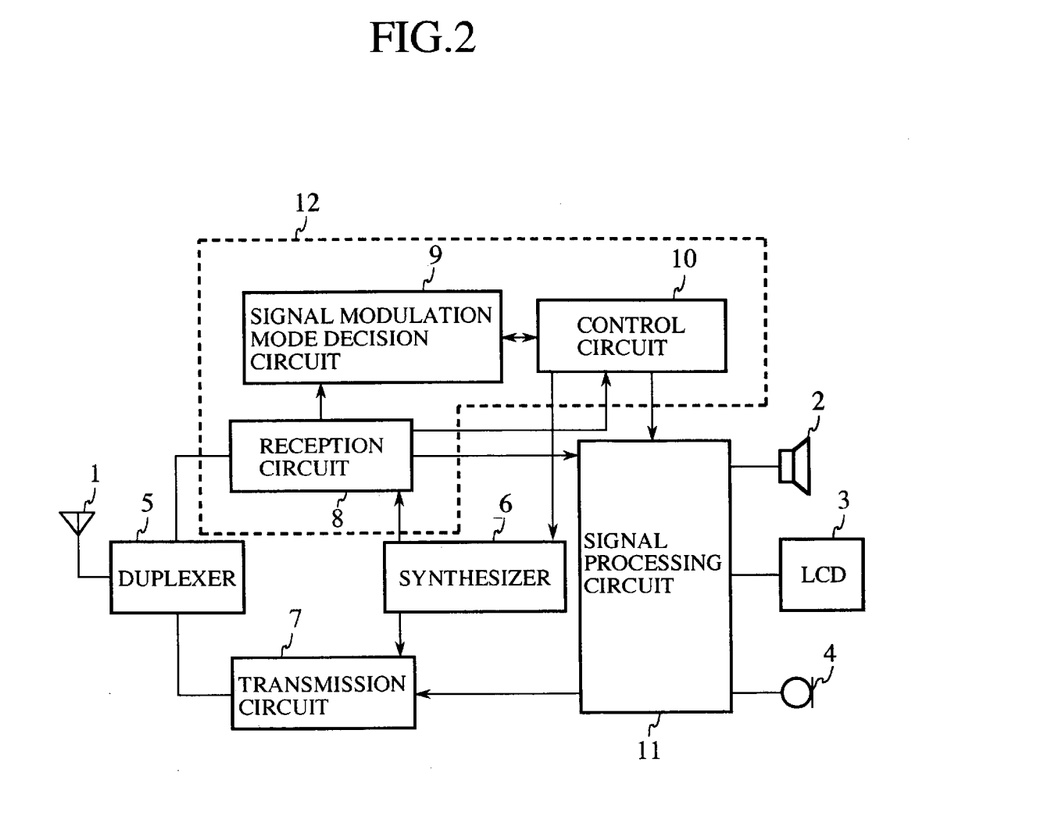
FIG. 2 is a block diagram showing a general configuration of the communication terminal device of the present invention.

FIG. 2 is a block diagram showing the communication terminal device according to a second embodiment of the present invention.

In the figure, reference numeral 4 denotes a microphone as shown in FIG. 1, numeral 11 denotes a signal processing circuit for processing the signal input from the microphone 4, numeral 7 denotes a transmission circuit, which modulates the signal input from the signal processing circuit 11 by use of a local oscillation signal fed from the synthesizer 6 and amplifies the electric power, and numeral 5 denotes a duplexer through which the signal input from this transmission circuit 7 is fed to the antenna 1 so as to be transmitted therefrom.

On the other hand, the signal received through the antenna 1 and passed to the duplexer 5 is fed to the signal reception circuit 8. In the same figure, numeral 9 denotes a decision circuit for deciding the modulation mode of the received signal, and on the basis of the decision made in this decision circuit 9, the signal reception circuit 8 demodulates the input signal by use of the local oscillation signal fed from the synthesizer 6. The signal thus demodulated is processed in the signal processing circuit 11, and outputs it from the speaker 2 as an audio signal, or output as a displayed data onto the LCD 3.

Figure 3:
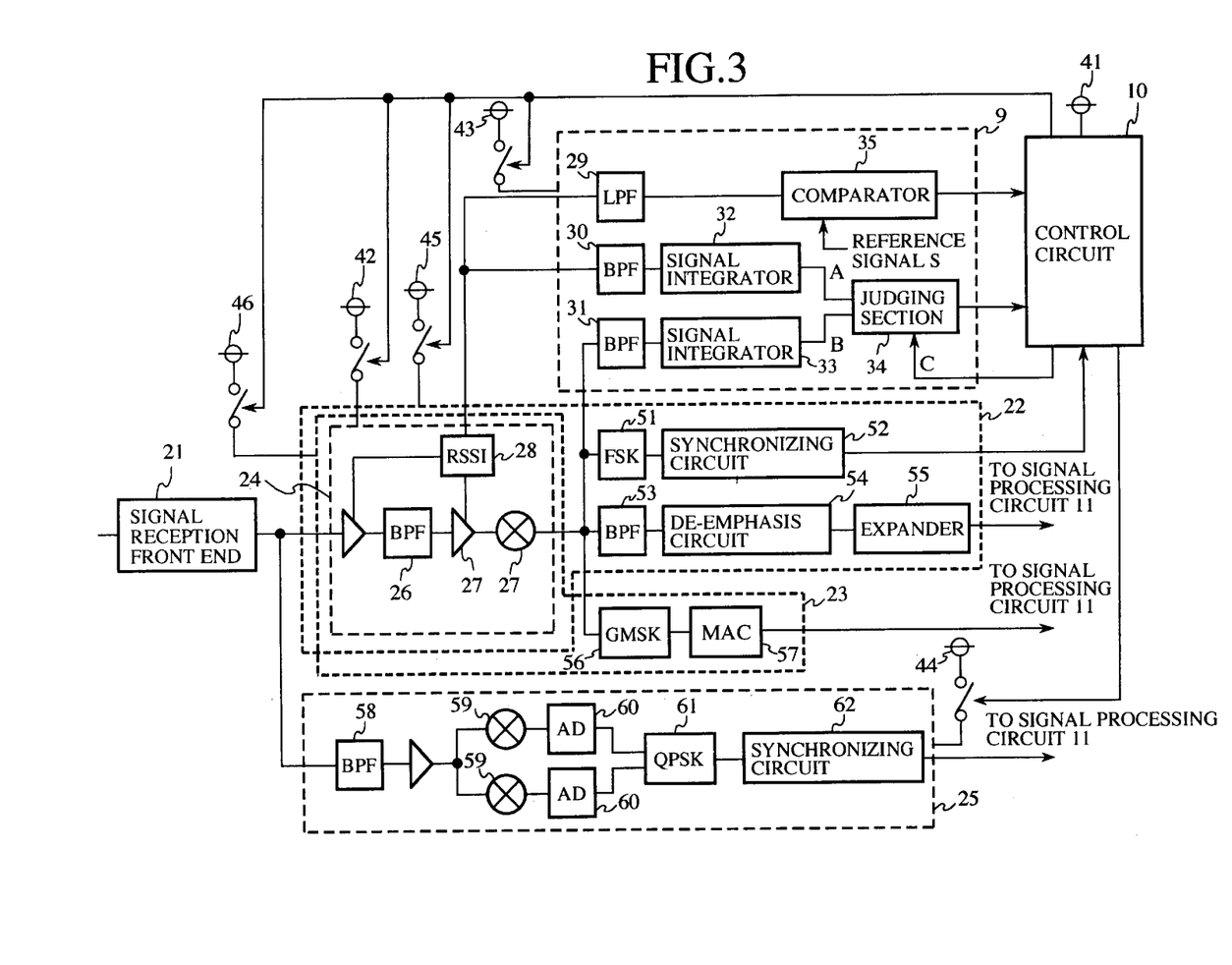
FIG. 3 is a block diagram showing the detail of the communication terminal device related to this invention.

The present invention principally relates to a block 12 including the signal reception circuit 8, the signal modulation mode decision circuit 9 and also the control circuit 10, and FIG. 3 is the block diagram for showing the detail of this block 12.

The communication systems supported by the communication terminal device of the present embodiment of this invention are the AMPS, the North-American TDMA system and the CDPD system, each adopting the FM modulation mode, the π/4 DQPSK mode, and the GMSK mode within the same frequency band.

The signal reception circuit 8 is configured by a signal reception front end 21 for converting the received signal into a signal of the intermediate frequency, and first, second and third demodulation circuits 22, 23 and 25, each corresponding to the respective modulation modes. The first demodulation circuit 22 is an FM demodulation circuit, and is composed of an FM demodulation section 24, an FSK (Frequency-shift keying) bit-demodulation circuit 51, a synchronizing circuit 52, a band-pass filter (or simply "BPF") 53, a de-emphasis circuit 54 and an expander 55. The second demodulation circuit 23 is a GMSK demodulation circuit composed of the above-explained FM demodulation section 24, a GMSK bit-demodulation circuit 56 and a MAC layer 57. In this embodiment, since the FM method is adopted for demodulating the signal of the GMSK mode, the GMSK demodulation circuit 23 commonly uses the FM demodulation section 24 which is a front-stage section of the FM demodulation circuit 22. The third demodulation circuit 25 is a quadrature demodulation circuit for demodulating the QPSK-demodulated signals, and is composed of a BPF 58, a quadrature demodulation sections 59, an A/D converters 60, a QPSK bit-demodulation section 61 and a synchronizing circuit 62.

The FM demodulation section 24 is further composed of a BPF 26, a limitter-discriminator 27, and a high-speed RSSI 28. The limitter-discriminator 27 is a kind of different coherent detector, and converts the input signal into an electric voltage corresponding to the frequency thereof. As the limitter-discriminator 27 does not need any local oscillation circuit for signal detection, there is no need to activate the local oscillation signal generating circuit either, so that the total power consumption will be much less than that of the quadrature demodulation circuit that needs a local oscillation circuit. Further, the high-speed RSSI 28, which converts the envelope of the input signal into an electrical voltage outputs a voltage signal that fluctuates at high speed following the fluctuation of the amplitude of the input QPSK-demodulated signal.

The signal output from the FM demodulation section 24 is input to the signal modulation mode decision circuit 9. Since it is configured in this embodiment of the present invention in such a manner that the signal fed to the decision circuit 9 is obtained from the FM demodulation section 24, which is a front-stage section of the FM demodulation circuit 22, the size of the decision circuit can be minimized. Further, since the FM demodulation section 24 is composed of the limitter-discriminator 27 and the high-speed RSSI 28, it can be implemented by a relatively simple construction.

The signal demodulation mode decision circuit 9 is composed of a low-pass filter (or simply "LPF") 29, BPFs 30 and 31, signal integrators 32 and 33, a comparator 35 and a judging section 34. The input signals to the low-pass filter 29 and the BPF 30 are fed from the high-speed RSSI 28, while the input signal to the BPF 31 is fed from the limitter-discriminator 27.

The comparator 35 compares the output signal from the LPF 29 and the reference signal S, and thereafter outputs the comparison result. The signal integrators 32 and 33 integrate output signals from the BPFs 30 and 31, respectively. The judging section 34 decides the signal modulation mode of the received signal on the basis of the identification signals A and B of the respective signal integrators 32 and 33.

Reference numeral 10 denotes a control circuit, which outputs a control signal C for instructing the decision of the modulation mode of the received signal to the judging section 34 on the basis of the comparison result of the comparator 35, and controls the power sources 42, 43, 44, 45 and 46, respectively for the FM demodulation section 24, the decision circuit 9, the quadrature demodulation circuit 25, the FM demodulation circuit 22 and the GMSK demodulation circuit 23. When the power source 42 of the FM demodulation section 24 is in the off state, if the power source 45 for the FM demodulation circuit 22 or the power source 46 for the GMSK demodulation circuit 23 is switched to the on state, the FM demodulation section 24 is set to the active state, whereas if the power sources 45 and 46 are switched to the off state, the FM demodulation section 24 is set to the inactive state.

On the other hand, if the power source 42 for the FM demodulation section 24 is in the on state, the FM demodulation section 24 is set to the active state, irrespective of the state of the power sources 45 and 46. The control circuit 10 itself is set to the active state by the power source 41.

The operation according to the above embodiment is now explained as below.

Figure 4:
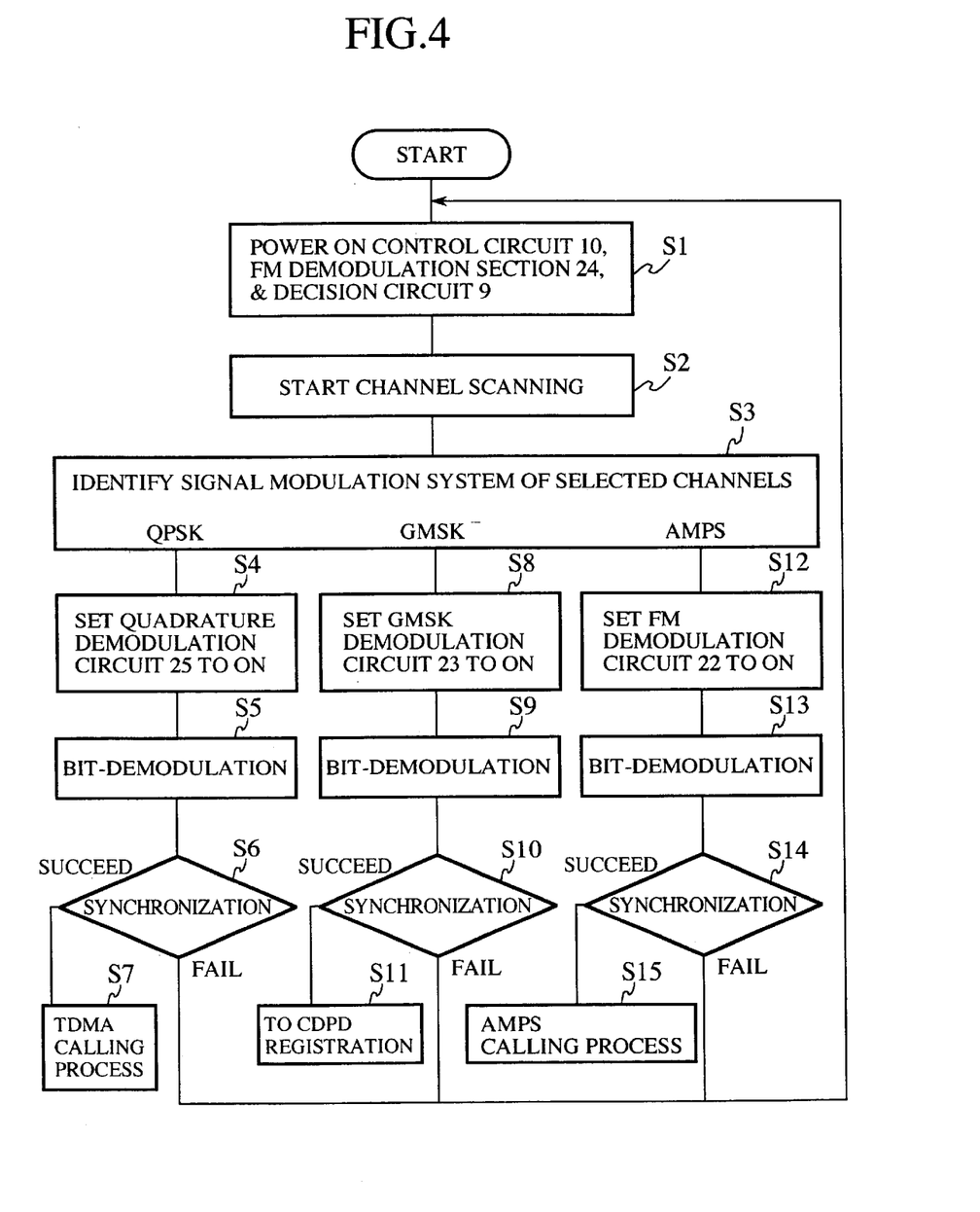
FIG. 4 is a flowchart showing the procedure for signal reception carried out by the communication terminal device of the present invention.

FIG. 4 is a flowchart showing the procedure for signal reception conducted by the communication terminal device according to the above embodiment of the present invention. When the power of the communication terminal device is switched on in step S1, the power sources 41, 42 and 43 respectively for the control circuit 10, the FM demodulation section 24 and the decision circuit 9 are switched on, and RSSI scanning operation is carried out with respect to the channels in the signal reception band (step S2), whereas other power sources 44, 45 and 46 are all switched off.

In this state, the radio wave received by the antenna 1 is modulated to the intermediate frequency at the signal reception front end 21 and input to the FM demodulation section 24. The thus received signal is input to the high-speed RSSI 28 in the FM demodulation section 24, and converted to the electric voltage in accordance with the envelope thereof and input to the decision circuit 9. The signal fed to the decision circuit 9 is fed to the low-pass filter 29 in which the cut-off frequency is sufficiently lowered, and is made to be a signal of the substantially constant level without any frequency component, and input to the comparator 35. The comparator 35 compares the level of this signal and the reference signal S, and outputs the comparison result. The control circuit 10 judges whether there is any reception signal that has entered the selected channel on the basis of the comparison result. In a case where it is judged that there is no such signal, then the RSSI scanning operation is continued and the same operation is carried out with respect to the next channel as well. However, in a case where it is judged that there is a signal entered the selected channel, then the control circuit 10 outputs a control signal C to the judging section 34 for instructing to start deciding the signal modulation mode as to that selected channel. In the judging section 34, the signal modulation mode deciding process as shown below is carried out in step S3 of FIG. 4.

If the selected channel is a control channel of the AMPS system, the signal received by the RSSI scanning operation is an FSK-modulated signal whose bit rate is 10 kbps, whereas the received signal is an FM modulation signal of the voice frequency band, if the corresponding channel is a traffic channel of the AMPS system. On the other hand, in the case of the North American TDMA system, the signal received by the RSSI scanning operation is a π/4 DQPSK-modulated signal, while in the case of the CDPD system, the signal is a GMSK-modulated signal.

Among those above-explained signals, the π/4 DQPSK-modulated signal only is a signal having an amplitude fluctuation, and when this signal is converted into a signal of the intermediate frequency in the signal reception front end 21 and input to the FM modulation section 24, the RSSI 28 sends a signal having a frequency component of 24.3 kHz, and the limitter-discriminator 27 outputs a signal of the substantially constant level without any frequency component.

Further, when the GMSK-modulated signal having a frequency fluctuation is input to the FM demodulation section 24, the limitter-discriminator 27 sends a signal having a frequency component of 9.6 kHz, whereas the high-speed RSSI 28 outputs a signal of the substantially constant level without any frequency component.

Further, when the FM modulation signal having a frequency fluctuation is input to the FM demodulation section 24, the limitter-discriminator 27 sends, if the selected channel is a control channel, a signal having the frequency component of 5 kHz, and it sends a signal having a frequency component of the voice frequency band (300 to 3000 Hz), if the selected channel is a traffic channel, whereas the high-speed RSSI outputs a signal of the substantially constant level without any frequency component in the both cases.

The signal output from the FM demodulation section 24 is fed to the signal modulation mode decision circuit 9.

The BPF 30 in the decision circuit 9 has a frequency band in which only the signal having the frequency component of 24.3 kHz among those fed from the high-speed RSSI 28 is allowed to pass.

If the signal of the selected channel is of the π/4 DQPSK modulation mode, the signal fed from the RSSI 28 includes the frequency component of 24.3 kHz, so that the signal passed through the BPF 30 is integrated in the signal integrator 32, and input to the judging section 34 as an identification signal A.

If the signal is of the GMSK modulation mode or of the FM modulation mode, the signal fed from the RSSI 28 includes no frequency component, so that it is hampered at the BPF 30, and accordingly no identification signal A is output. Therefore, if the identification signal A is monitored in the judging section 34 and the signal level is detected to be greater than the predetermined level, then it can be judged as a signal of the North American TDMA system.

The BPF 31 in the decision circuit 9 has a frequency band in which only the signal including the frequency component of 9.6 kHz among those signals provided from the limitter-discriminator 27 is allowed to pass.

If the signal of the selected channel is of the GMSK modulation mode, the signal output from the limitter-discriminator 27 includes the frequency component of 9.6 kHz, so that the signal passed through the BPF 31 is integrated in the signal integrator 33, and is input thereafter to the judging section 34 as an identification signal B.

If the signal is of the π/4 DQPSK modulation mode, the signal output from the limitter-discriminator 27 includes no frequency component, so that it cannot pass through the BPF 31 and thus no identification signal B is output. Further, if the signal is of the FM modulation mode, the signal output from the limitter-discriminator 27 includes either the frequency component of 5 KHz or that of the voice signal band (300 to 3000 Hz), so that it is hampered at the BPF 31, and thus no identification signal B is output. Due to this, if the identification signal B is supervised in the judging section 34, and the signal level is detected to be greater than the predetermined level, then it can be judged as a signal of the CDPD system.

If neither one of these identification signals A and B is detected to be the signal whose signal level is greater than the predetermined level, then the signal of the selected channel is judged to be of the AMPS. In other words, due to the above operations, modulation mode of the received signal can be judged in quite a short time by monitoring the identification signals A and B at the judging section 34.

When both the identification signals A and B are detected to be of the signal level greater than the predetermined level in the judging section 34, the system whose calling process is to be carried out first is determined in the control circuit 10 out of the thus identified modulated signals in accordance with the preset priority order, and due to this, the priority order for selecting the system can be established.

In the case where only one system is identified in the judging section 34, the thus identified system is determined to be the system which is to be shifted to its calling process in the control circuit 10.

If the system to be shifted to its calling process is determined to be a signal of the North-American TDMA (π/4 DQPSK) system in step S3, the power source 44 for the quadrature demodulation circuit 25 is set to on by the control circuit 10 in step S4, and thereafter the quadrature demodulation signal is bit-demodulated in step S5, synchronized in step S6, and shifted to the calling process corresponding to the North-American TDAM system in step S7. Simultaneously, the power sources 42, 45, 46 and 43, respectively for the FM demodulation section 24, the first demodulation circuit 22, the second demodulation circuit 23, and the decision circuit 9 are set to ON.

If the system to be shifted to its calling process is determined to be a signal of the CDPD (GMSK) system in step S3, the power source 46 for the GMSK demodulation circuit 23 is set to on by the control circuit 10 in step S8, and thereafter the output signal from the FM demodulation section 24 is bit-demodulated in step S9, synchronized in step S10, and shifted to the calling process corresponding to the CDPD system in step S11. Simultaneously, the power sources 45, 44 and 43, respectively for the first demodulation circuit 22, the second demodulation circuit 25 and the decision circuit 9 are set to ON.

If the system to be shifted to its calling process is determined to be a signal of the AMPS system in step S3, the power source 45 for the FM demodulation circuit 22 is set to ON by the control circuit 10 in step S12, and thereafter the output signal from the FM demodulation section 24 is bit-demodulated in step S13, synchronized in step S14, and shifted to the calling process corresponding to the AMPS system in step S15. Simultaneously, the power sources 46 and 44 and 43, respectively for the second demodulation circuit 23, the third demodulation circuit 25 and the decision circuit 9 are set to ON.

In the case where the synchronization conducted in steps S6, S10 and S14 are unsuccessful, the procedure goes back to step S1, where the power sources 42 and 43 respectively for the FM demodulation section 24 and the decision circuit 9 are set to ON, and the channel scanning operation is repeated from step S2.

At the communication terminal device functioning as above, demodulation circuits corresponding to each of the modulation mode are set to ON, in accordance with the decision of the modulation system, and simultaneously the power source 43 of the decision circuit 9 is set to OFF, so that the total power consumption can be greatly reduced.

As explained heretofore, since the communication terminal device according to the present invention is constructed as above, decision of the modulation mode can be performed in quite a short time by use of the signal modulation mode decision circuit, and due to the fact that the decision circuit is put into an inactive state after the decision of the modulation mode, the total power consumption can be greatly saved.

Further, since the decision circuit and other demodulation circuits which do not correspond to the received signal are put to an inactive state after the decision of the modulation mode, the total power consumption can be greatly saved.

Further, since the decision of the modulation mode is performed by use of the signal component fed from the front-stage of the demodulation circuit, the total size of the circuit configuration can be minimized.

Still further, since the above front-stage section is composed of the RSSI and the limiter-discriminator, it can be readily constructed.

Yet still further, in the case that there are many modulation modes, the modulation mode to be shifted to its calling process can be selected in accordance with the predetermined priority order.

What is claimed is:

1. A communication terminal device comprising:

a plurality of demodulation circuits that correspond to the received signals of the same frequency band, said signals being modulated in respectively different modulation modes, a decision circuit for determining the modulation mode of each of the received signals whose reception level is greater than a predetermined level on the basis of the frequency component of the received signal, and a control circuit, which puts one of the demodulation circuits that corresponds to the modulation mode of said received signal to an active state on the basis of the decision made by said decision circuit, and simultaneously puts said decision circuit to an inactive state, wherein a first demodulation circuit among said plurality of demodulation circuits is an FM demodulation circuit, said first demodulation circuit being composed of a front-stage section and a rear-stage section, and said decision circuit inputs the frequency component of the received signal from said front-stage section, and wherein said front-stage section of said first demodulation circuit includes a signal strength indicator and a discriminator.

2. A communication terminal device according to claim 1, wherein said control circuit puts all other demodulation circuits than said activated demodulation circuit to an inactive state, as well as said decision circuit.

3. A communication terminal device according to claim 1, wherein said decision circuit further comprises:

a first band-pass filter that allows only a first frequency component fed from said signal strength indicator to pass through;

a second band-pass filter that allows only a second frequency component fed from said discriminator to pass through;

a first integrator that integrates the first frequency component fed from said first band-pass filter and identifies its signal modulation mode;

a second integrator that integrates the second frequency component fed from said second band-pass filter and identifies its signal modulation mode; and a signal modulation mode judging section that receives the outputs from said first and second integrators, and discriminates at least three signal modulation modes of the received signals.

4. A communication terminal device according to claim 3, wherein in the case where there are a plurality of signal modulation modes determined at said decision circuit, said control circuit applies a predetermined priority order to said plurality of modulation modes.

5. A communication terminal device according to claim 1, wherein a second demodulation circuit in said plurality of demodulation circuits is a GMSK demodulation circuit, said GMSK circuit sharing said front-stage section of said first demodulation circuit.

6. A communication terminal device according to claim 5, wherein said decision circuit further comprises:

a first band-pass filter that allows only a first frequency component fed from said signal strength indicator to pass through;

a second band-pass filter that allows only a second frequency component fed from said discriminator to pass through;

a first integrator that integrates the first frequency component fed from said first band-pass filter and identifies its signal modulation mode;

a second integrator that integrates the second frequency component fed from said second band-pass filter and identifies its signal modulation mode; and a signal modulation mode judging section that receives the outputs from said first and second integrators, and discriminates at least three signal modulation modes of the received signals.

7. A communication terminal device according to claim 6, wherein in the case where there are a plurality of signal modulation modes determined at said decision circuit, said control circuit applies a predetermined priority order to said plurality of modulation modes.

8. A communication terminal device comprising:

a plurality of demodulation circuits that correspond to the received signals of the same frequency band, said signals being modulated in respectively different modulation modes, a decision circuit performing a channel scanning operation through which a level of the received signals and a predetermined level are compared to specify selected channels, and only after the channel scanning operation determines that the received signals exceed the predetermined level, for determining the modulation mode of each of the received signals contained in the selected channels on the basis of the frequency component of the received signal, a control circuit, which puts one of the demodulation circuits that corresponds to the modulation mode of said received signal to an active state on the basis of the decision made by said decision circuit, and simultaneously puts said decision circuit to an inactive state, wherein a first demodulation circuit among said plurality of demodulation circuits is an FM demodulation circuit, said first demodulation circuit being composed of a front-stage section and a rear-stage section, and said decision circuit inputs the frequency component of the received signal from said front-stage section, and wherein said front-stage section of said first demodulation circuit includes a signal strength indicator and a discriminator.

9. A communication terminal device according to claim 8, wherein said decision circuit further comprises:

a first band-pass filter that allows only a first frequency component fed from said signal strength indicator to pass through;

a second band-pass filter that allows only a second frequency component fed from said discriminator to pass through;

a first integrator that integrates the first frequency component fed from said first band-pass filter and identifies its signal modulation mode;

a second integrator that integrates the second frequency component fed from said second band-pass filter and identifies its signal modulation mode; and a signal modulation mode judging section that receives the outputs from said first and second integrators, and discriminates at least three signal modulation modes of the received signals.

10. A communication terminal device according to claim 9, wherein in the case where there are a plurality of signal modulation modes determined at said decision circuit, said control circuit applies a predetermined priority order to said plurality of modulation modes.

11. A communication terminal device according to claim 8, wherein a second demodulation circuit in said plurality of demodulation circuits is a GMSK demodulation circuit, said GMSK circuit sharing said front-stage section of said first demodulation circuit.

12. A communication terminal device according to claim 11, wherein said decision circuit further comprises:

a first band-pass filter that allows only a first frequency component fed from said signal strength indicator to pass through;

a second band-pass filter that allows only a second frequency component fed from said discriminator to pass through;

a first integrator that integrates the first frequency component fed from said first band-pass filter and identifies its signal modulation mode;

a second integrator that integrates the second frequency component fed from said second band-pass filter and identifies its signal modulation mode; and a signal modulation mode judging section that receives the outputs from said first and second integrators, and discriminates at least three signal modulation modes of the received signals.

13. A communication terminal device according to claim 12, wherein in the case where there are a plurality of signal modulation modes determined at said decision circuit, said control circuit applies a predetermined priority order to said plurality of modulation modes.

* * * * *